United States Patent [19]

Gore

[11] Patent Number: 5,598,200
[45] Date of Patent: Jan. 28, 1997

[54] METHOD AND APPARATUS FOR PRODUCING A DISCRETE DROPLET OF HIGH TEMPERATURE LIQUID

[76] Inventor: David W. Gore, 1233 NW Lewisburg Ave., Corvallis, Oreg. 97330

[21] Appl. No.: 378,713

[22] Filed: Jan. 26, 1995

[51] Int. Cl.[6] .............................. G01D 15/18; B41J 2/045
[52] U.S. Cl. ................................. 347/88; 347/54
[58] Field of Search .................. 347/54, 88, 55

[56] References Cited

U.S. PATENT DOCUMENTS

| | | | |
|---|---|---|---|
| 3,222,776 | 12/1965 | Kawecki | 29/503 |
| 3,298,030 | 1/1967 | Lewis et al. | 346/75 |
| 3,373,436 | 3/1968 | Auphan | 16/75 |
| 3,463,365 | 8/1969 | Dumont-Fillon | 222/544 |
| 3,596,285 | 7/1971 | Gottwald | 346/75 |
| 4,014,693 | 3/1977 | Clark | 346/15 D |
| 4,349,829 | 9/1982 | Bovio et al. | 346/140 R |
| 4,398,589 | 8/1983 | Eldred | 164/337 |
| 4,459,601 | 7/1984 | Howkins | 347/55 |
| 4,631,557 | 12/1986 | Cooke | 347/88 |
| 4,665,492 | 5/1987 | Masters | 364/468 |
| 4,684,956 | 8/1987 | Ball | 347/88 |
| 4,812,856 | 3/1989 | Wallace | 346/1.1 |
| 4,961,455 | 10/1990 | Redemake et al. | 164/63 |
| 5,053,100 | 10/1991 | Hayes et al. | 156/294 |
| 5,074,532 | 12/1991 | Ducrocq et al. | 266/237 |
| 5,111,220 | 5/1992 | Hadimioglu et al. | 346/140 R |
| 5,193,738 | 3/1993 | Hayes | 228/180.2 |
| 5,229,016 | 7/1993 | Hayes et al. | 222/590 |
| 5,386,224 | 1/1995 | Deur | 347/88 |

FOREIGN PATENT DOCUMENTS

0426363A2  5/1991  European Pat. Off. .
62-34664   2/1987  Japan .
62-142066  6/1987  Japan .
1-122651   5/1989  Japan .

OTHER PUBLICATIONS

Mitchell et al., "Ink on Demand Printing and Copying Employing Combined Ultrasonic and Electrostatic Control," IBM Technical Disclosure Bulletin, vol. 18, No. 2 (Jul. 1975), pp. 608–609.

*Primary Examiner*—Valerie Lund
*Attorney, Agent, or Firm*—Stoel Rives LLP

[57] ABSTRACT

A method and an apparatus (10) eject on demand a discrete droplet (12) of liquid at a high temperature along a predetermined trajectory (18) by transferring a physical impulse from a low temperature environment to a high temperature environment. The ejector apparatus includes a vessel (26) having an interior (24) that contains a high-temperature liquid (14), such as liquid metal, Al, Zn or Sn. The interior includes an inlet end (30) that receives a thermally insulative impulse transmitting device (22) and a feed supply (34) of the droplet material, and a discharge region (56) having an orifice (16) through which the discrete droplets are ejected. An inert gas is feed through the inlet end and into the vessel to create an overpressure over the liquid so that as the overpressure is increased the droplet size is increased. A heater (70) heats the material contained within the interior. An impulse generator (20) is connected and imparts a physical impulse to the impulse transmitting device to produce an ejection pressure at the orifice to eject a discrete droplet of the high-temperature liquid. The impulse generator including a pulse generator electrically connected to a pulse amplifier that is electrically connected to an acoustic device, such as a loudspeaker.

19 Claims, 3 Drawing Sheets

5,598,200

METHOD AND APPARATUS FOR PRODUCING A DISCRETE DROPLET OF HIGH TEMPERATURE LIQUID

TECHNICAL FIELD

The present invention relates to producing discrete droplets of a liquid at a high temperature and, in particular, to producing a series of liquid metal droplets by ejecting on demand each droplet along a predetermined trajectory.

BACKGROUND OF THE INVENTION

Liquid droplet ejection techniques are well known in the field of ink-jet printers and metal spray devices. Ink-jet printers typically create a printed image by ejecting water-based inks or hot-melt waxes through an orifice at an ambient or relatively low temperature. A wide variety of materials is used to manufacture the ejection mechanisms for these printers because of the low temperature of the printing process. For example, piezoelectric crystals are used to convert an electrical signal into an acoustical signal to eject a low temperature droplet of ink. In another example, a bundle of fine wires is used to transmit an ultrasonic pulse to an ink meniscus to eject an ink droplet at a low temperature. At temperatures greater than 600° Celsius, however, piezoelectric materials and bundles of fine wires decompose or cease to function.

Metal spray devices, such as the apparatus shown in U.K. Pat. No. 1,472,939 to Osprey, typically are manufactured of materials that can withstand the high temperatures associated with ejection of liquid metal droplets. The ejected droplets, however, follow erratic trajectories and cannot be used to build precision structures such as those described in U.S. Pat. No. 5,257,657 to Gore. Other devices, such as the apparatus shown in U.S. Pat. No. 5,171,360 to Orme, produce a stream of metal droplets at 200° Celsius with a precisely controlled trajectory but cannot produce discrete droplets on demand.

Accordingly, a need exists for an ejection method and apparatus that eject a discrete droplet of liquid on demand at a high temperature along a predetermined trajectory without the disadvantages of the prior art.

SUMMARY OF THE INVENTION

An object of the present invention is, therefore, to provide an apparatus and a method in which the droplet ejector is manufactured of materials that withstand the high temperatures associated with ejection of liquid droplets at a high temperature.

Another object of the invention is to provide an apparatus and a method in which discrete liquid droplets at a high temperature are ejected on demand along a predetermined trajectory.

The present invention is a method and an apparatus for ejecting on demand a discrete droplet of liquid at a high temperature along a predetermined trajectory by transferring a physical impulse from a low temperature environment to a high temperature environment. The ejection apparatus includes a vessel having an interior that contains the high-temperature liquid. The interior is defined by an inlet that receives an impulse transmitting device and a feed supply of the droplet material, a discharge region that has an orifice through which discrete droplets of the high-temperature liquid are ejected, and a sidewall that connects the inlet and the discharge region and is connected to a heater that heats and maintains the high temperature of the liquid.

In a preferred embodiment, the impulse transmitting device is a thermally insulating ceramic rod positioned in the interior of the vessel to function as a piston. The rod has a base end that receives a physical impulse from an impulse generator and a head end having a face that imparts the physical impulse to the liquid to eject a droplet. The base end of the rod extends outwardly from the inlet of the interior, and the face is positioned within the high-temperature liquid and adjacent the orifice through which the discrete droplets are ejected. The insulating rod is preferably manufactured of ceramic material so that heat is not easily thermally conducted upwardly along its length from the high-temperature liquid to the base end extending outwardly from the chamber. Because of the use of a thermally insulating impulse transmitting device, components of the apparatus positioned outside the vessel can be manufactured of conventional materials not resistant to heat.

The impulse generator is operatively associated with and provides the physical impulse to the base of the impulse transmitting device to eject a discrete droplet of high-temperature liquid from the orifice. In a preferred embodiment, the impulse generator includes an electric generator that generates and transfers a momentary electrical pulse to an acoustic device connected between the electric generator and the base end of the impulse transmitting device. The acoustic device preferably includes a loudspeaker having a cone and a core attached to the cone and positioned adjacent the base. The loudspeaker converts the electrical pulse into a momentary physical impulse that causes the core to momentarily move outwardly from the loudspeaker cone and then return to its nominal starting position. Movement of the core imparts the physical impulse to the impulse transmitting device causing momentary movement of the face toward the orifice and thereby creates a momentary ejection pressure at the orifice causing ejection of a droplet. The acoustic device can be manufactured of an inexpensive cardboard because the impulse transmitting device prevents heat transfer along its insulative rod from the high-temperature liquid and thereby prevents damage to the cardboard.

Additional objects and advantages of the present invention will be apparent from the following detailed description of a preferred embodiment, which proceeds with reference to the accompanying drawings.

DETAILED DESCRIPTION OF A PREFERRED EMBODIMENT

Figure 1:
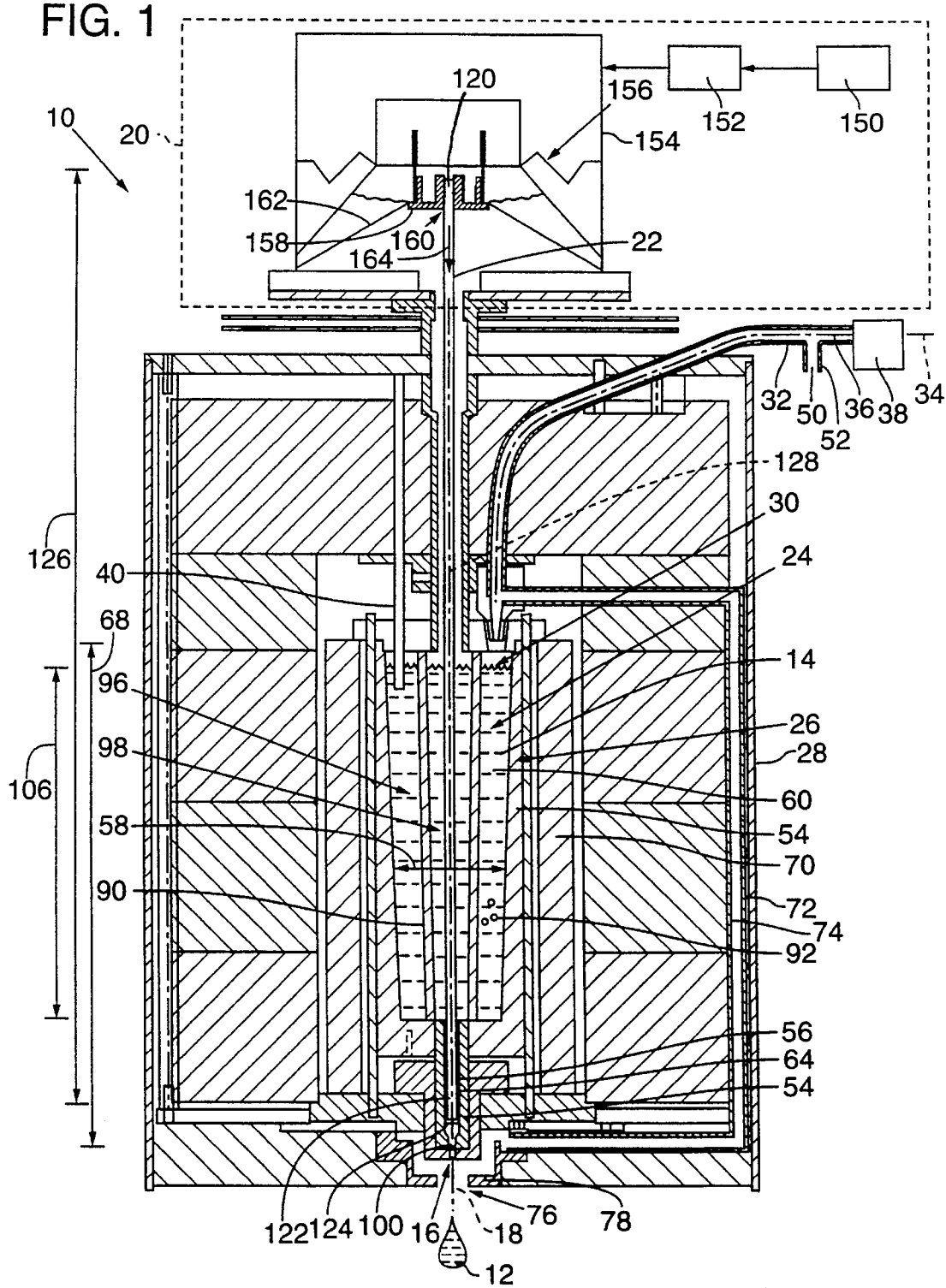
FIG. 1 is a cross-sectional side view of the ejection apparatus showing the acoustic device connected to the impulse transmitting device positioned in the vessel containing the high-temperature liquid.

FIG. 1 shows a droplet ejector apparatus 10 designed to eject on demand a discrete droplet 12 of liquid 14 at a high temperature from an orifice 16 along a predetermined trajectory 18. Ejector apparatus 10 includes an impulse generator 20 positioned adjacent and transmitting a physical impulse to a transmitting device 22 positioned in and extending from an interior 24 of a hollow cylindrical vessel 26 containing liquid 14 at a high temperature, vessel 26 being contained within a container 28.

Vessel 26 includes an inlet end 30 that receives through a feed supply line 32 a feed supply 34 (shown in dash lines) of a meltable material 36, which is typically a continuous flexible welding wire of aluminum, zinc, or tin, that is fed through inlet end 30 and into interior 24 by a drive motor 38. A level sensor 40 connected in a conventional manner to drive motor 38 prevents overflow of liquid 14 from vessel 26.

An inert gas 50, typically nitrogen or argon, is fed to feed supply line 32 through an inlet 52 and accompanies material 36 as it is fed to inlet end 30 to create an overpressure over liquid 14 in vessel 26 and to prevent oxidation and premature melting of material 36 as it enters vessel 26. As the overpressure of inert gas 50 over liquid 14 in vessel 26 is increased, the size of ejected droplet 12 increases.

Vessel 26 includes a sidewall 54 that connects inlet end 30 and a discharge region 56 of vessel 26. Sidewall 54 is typically a curved wall so that vessel 26 is a hollow cylinder having a mean inner diameter 58 of about 4 centimeters (1.5 inches) in a reservoir region 60 of interior 24 and an inner diameter 62 (FIG. 2) of 0.64 centimeters (0.25 inches) in a chamber region 64 of interior 24. Sidewall 54 typically has a thickness 66 (FIG. 2) of 0.3 centimeters (0.1 inch) and a total length 68 of 12.7 centimeters (5 inches). Sidewall 54 is typically manufactured of a heat-resistant ceramic, such as alumina, silicon nitride, or graphite, because conventional materials can be severely attacked by molten metal at elevated temperatures.

A heater 70 is thermally coupled to sidewall 54 to heat material 36 fed into interior 24 to a temperature above its melting point so that it becomes high-temperature liquid 14. Heater 70 also maintains liquid 14 at a high temperature. Heater 70 may be an electrical resistance heater, a combustion heater, or an induction heater positioned within liquid 14. If inert gas 50 is used to protect heater 70 from oxidation, a high temperature resistance heater using graphite or metals such as tungsten can be used.

Heater 70 is preferably a resistance heater and is positioned generally adjacent vessel 26 along its length 68 to heat sidewall 54. An insulator 74, typically a ceramic fiber, is positioned inside container 28 and surrounding heater 70 and transmitting device 22 to thermally insulate vessel 26.

Figure 2:
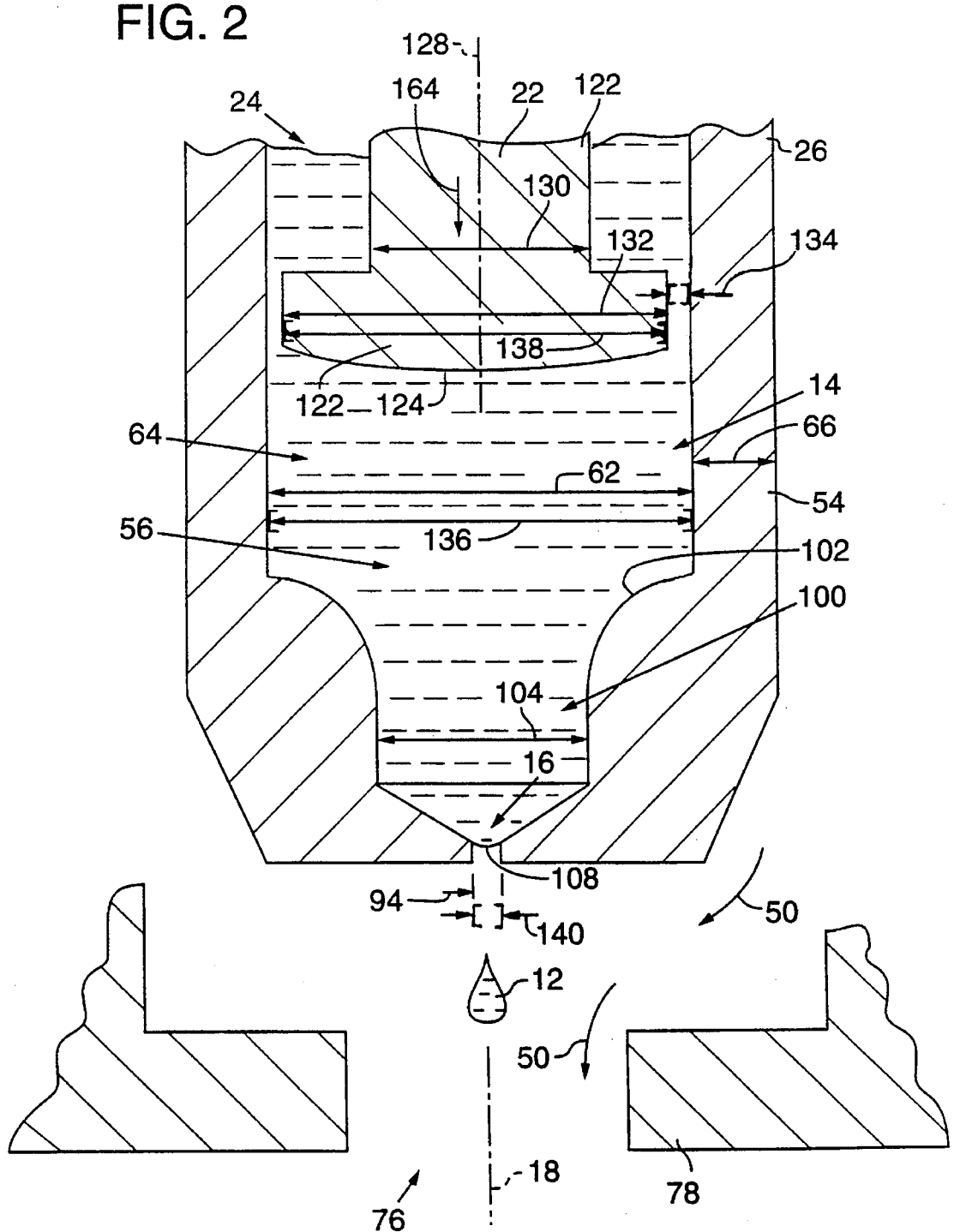
FIG. 2 as an enlarged cross-sectional side elevation view showing in detail the lower region of the vessel of FIG. 1.

Inert gas 50 is funnelled from feed supply line 32 to a transfer tube 72 positioned outwardly of insulator 74 and away from high temperature vessel 26 so that inert gas 50 remains at a relatively cool temperature. Inert gas 50 travels through tube 72 and into an opening 76 defined by a constrictor 78 positioned adjacent discharge region 56 so that inert gas 50 prevents oxidation of ejected droplet 12 as it leaves orifice 16. Inert gas 50 also ensures regular droplet shape for aluminum and zinc droplets because these droplets are ejected in regular spherical droplets in the presence of inert gas 50 and are ejected in irregular string-like droplets in the absence of inert gas 50.

Reservoir 60 of vessel 26 may include a cylindrical filter 90 that captures solid particles 92 contained in high-temperature liquid 14 so that they do not flow downwardly into discharge region 56 and block orifice 16. Particles 92 are typically metal oxide contaminants and may have a diameter greater than a diameter 94 (FIG. 2) of orifice 16. Filter 90 separates reservoir 60 into an unfiltered region 96 that receives feed supply 34 and contains particles 92, and a filtered region 98 that receives the flow of high-temperature liquid 14 through filter 90 from unfiltered region 96.

With reference to FIGS. 1 and 2, chamber 64 of interior 24 includes discharge region 56 having an antechamber 100 with a curved surface 102 leading to orifice 16. Curved surface 102 of antechamber 100 allows the use of lower energy physical impulses to eject droplet 12 than the energy required without a curved surface. Antechamber 100 preferably has a diameter 104 that is about one-half of inner diameter 62 of chamber 64.

Reservoir 60 is positioned above chamber 64 and orifice 16 so that liquid 14 forms a gravity head 106 in vessel 26 and flows downwardly toward chamber 64 to form a meniscus 108 at orifice 16. The maximum allowable gravity head 106 to prevent dripping is inversely proportional to orifice diameter 94 and also depends on the density and surface tension of the molten metal used and the material used to manufacture orifice 16. Increasing gravity head 106 typically increases the size of ejected droplet 12.

Orifice 16 is manufactured of a non-wetting material such as silicon nitride, alumina, zirconium phosphate, or machinable glass ceramic and has a diameter 94 of about 0.05 centimeters (0.02 inches) for the ejection of aluminum droplets. The non-wetting material is chosen based on the physical characteristics of droplet material 36 to prevent dripping and to ensure that droplet 12 follows predetermined trajectory 18 when ejected from orifice 16 by transmitting device 22. Molten aluminum alloys, for example, tend to wet all metals and so orifice 16 must be manufactured of ceramic materials such as silicon nitride or alumina. Molten tin alloys, on the other hand, may allow use of stainless steel as an orifice material.

Impulse transmitting device 22 is a thermally insulating elongate rod positioned in interior 24. Impulse transmitting device 22 has a base end 120 and extends downward through inlet end 30 and interior 24 to, a head end 122 having a face 124 positioned adjacent orifice 16. Impulse transmitting device 22 has a length 126 extending along an axis 128 and defined by the distance between base end 120 and head end 122. Impulse transmitting device 22 is typically fabricated of a thermally insulating material such as silicon nitride, alumina, graphite, zirconium phosphate, or machinable glass ceramic so that heat is not easily thermally conducted along length 126 from a high temperature environment at head end 122 to a low temperature environment at base end 120. Impulse transmitting device 22 and insulator 74 thermally isolate vessel 26 so that components of apparatus 10 positioned outwardly of insulator 74 can be manufactured of conventional materials not necessarily resistant to heat.

Impulse transmitting device 22 is preferably cylindrical and has a nominal diameter 130 of about 3 millimeters (0.12 inch) substantially along length 126, a head end diameter 132 of about 0.56 centimeters (0.22 inches), and is about 25 centimeters (10 inches) long measured along length 126. Head end diameter 132 should be at least nine times greater than orifice diameter 94, otherwise, very large impulses are needed to eject droplet 12.

With particular reference to FIG. 2, the dimensional difference between head end diameter 132 of head end 122 and inner diameter 62 of chamber 64 defines a cross-sectional clearance area 134 of about 0.072 square centimeters (0.011 square inches). Clearance area 134 is calculated as a cross-sectional area 136 of chamber 64, about 0.317 square centimeters (0.049 square inches), minus a cross-sectional area 138 of face 124, about 0.245 square centimeters (0.038 square inches). Skilled workers will recognize that the cross-sectional areas described herein are represented in FIG. 2 as bracketed cross-sectional linear dimensions. A ratio of cross-sectional clearance area 134 to a cross-sectional area 140 of orifice 16, about 0.002 square centimeters (0.0003 square inches), is preferably at least five to one. A small ratio does not allow a sufficient flow of liquid 14 downwardly around head end 122 to replace liquid 14 ejected through orifice 16, and a large ratio requires a large impulse force to eject droplet 12. For aluminum alloys, the preferable ratio is a cross-sectional clearance area 134 that is about 40 times greater than cross-sectional area 140 of orifice 16.

With particular reference to FIG. 1, impulse generator 20 includes a pulse generator 150 that generates a square wave electrical pulse, also called a momentary electrical pulse, having a pulse width of about 0.6 millisecond. Typically, as the pulse width of the electrical pulse increases, the size of droplet 12 increases. An amplifier 152 receives from pulse generator 150 the electrical pulse and amplifies it to about 10 volts to produce an amplified electrical pulse that is delivered to an acoustic device 154.

Figure 3:
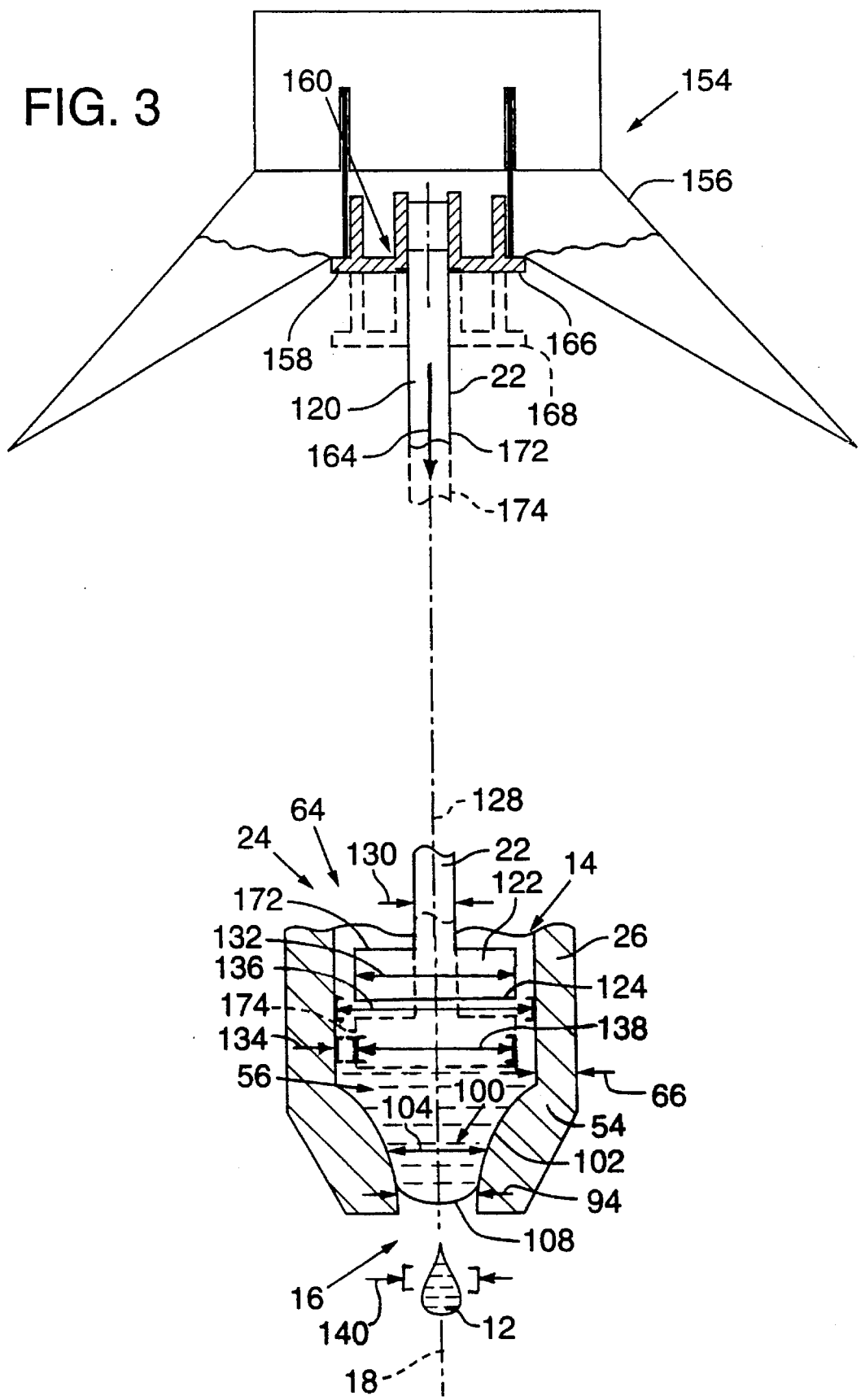
FIG. 3 is an enlarged fragmentary cross-sectional side elevation view showing in solid and phantom lines a rest position and an eject position, respectively, of the impulse transmitting device of FIG. 1.

With reference to FIG. 3, acoustic device 154 typically includes a loudspeaker 156 that converts the amplified electrical pulse into a physical impulse that is applied to impulse transmitting device 22 by movement of a core 158 having a central region 160 that receives base end 120 of end impulse transmitting device 22. Core 22 is typically an aluminum disk that is adhered to a cone 162 of loudspeaker 156. When the amplified electrical pulse reaches loudspeaker 156, it causes cone 162 to move outwardly thereby causing central region 160 of core 158 to move momentarily outwardly in a direction 164 from an unexcited position 166 to an excited position 168 away from loudspeaker 156.

Movement of central region 160 of core 158 forces impulse transmitting device 22 to move in direction 164 along its axis 128 from a rest position 172 to an eject position 174 (shown in FIG. 3 as phantom lines) so that face 124 of impulse transmitting device 22 momentarily moves toward and then away from orifice 16. Movement of face 124 toward orifice 16 creates an ejection pressure at orifice 16 that overcomes the capillary effects of meniscus 108 and forces the ejection of discrete droplet 12 of liquid 14 at a high temperature from orifice 16 along predetermined trajectory 18. For example, using an electrical pulse having a 10 volt amplitude and a 0.6 millisecond pulse width, a 20 watt loudspeaker, and a 0.5 millimeter diameter orifice, a 0.7 milligram droplet of aluminum is ejected.

It will be obvious to those having skill in the art that many changes may be made to the details of the above-described embodiment and method of this invention without departing from the underlying principles thereof. The scope of the present invention should, therefore, be determined only by the following claims.

I claim:

1. A high-temperature liquid droplet ejection apparatus for ejecting on demand a discrete droplet of a liquid metal at a high temperature from an orifice along a predetermined trajectory comprising:

a vessel having an interior for containing the liquid metal at a high temperature, the interior including an inlet end, a discharge region having an orifice, and a sidewall connecting the inlet end and the discharge region;

a thermally insulative impulse transmitting device having a base end exterior of the vessel and extending through the inlet end of the vessel and a head end having a face positioned within the interior and adjacent the orifice; and an impulse generator that provides a physical impulse to the base end of the impulse transmitting device so that the face of the transmitting device is momentarily moved toward the orifice to produce an ejection pressure at the orifice that causes ejection of a discrete droplet of the liquid metal contained in the vessel from the orifice along a predetermined trajectory.

2. The apparatus of claim 1 in which the impulse generator includes a pulse generator electrically connected to an acoustic device operatively associated with the base end of the impulse transmitting device, the pulse generator generating an electrical pulse and transferring the electrical pulse to the acoustic device, and the acoustic device converting the electrical pulse into the physical impulse and transferring the physical impulse to the base end of the impulse transmitting device.

3. The apparatus of claim 2 in which the acoustic device comprises a loudspeaker positioned adjacent the base end of the impulse transmitting device.

4. The apparatus of claim 3 in which the loudspeaker includes a core surrounding the base end of the impulse transmitting device.

5. The apparatus of claim 2 in which the impulse generator further comprises a pulse amplifier electrically connected to the pulse generator that amplifies the electrical pulse transferred by the pulse generator to the acoustic device.

6. The apparatus of claim 1 in which the orifice has a cross-sectional area and the vessel has a cross-sectional clearance area defined by a cross-sectional area of the interior of the vessel minus a cross-sectional area of the face of the impulse transmitting device, the cross-sectional clearance area being at least five times greater than the cross-sectional area of the orifice.

7. The apparatus of claim 1 further comprising a heater thermally associated with the vessel to heat the liquid metal contained within the vessel.

8. The apparatus of claim 1 in which the impulse transmitting device is fabricated from an insulative material selected from the group consisting essentially of silicon nitride, alumina, graphite, zirconium phosphate, and machinable glass ceramic.

9. The apparatus of claim 1 in which the orifice is fabricated from a non-wetting material selected from the group consisting essentially of silicon nitride, alumina, zirconium phosphate, and machinable glass ceramic.

10. The apparatus of claim 1 in which the liquid metal is selected from a group consisting essentially of aluminum, zinc, and tin.

11. A method of ejecting on demand a discrete droplet of a liquid metal at a high temperature from an orifice along a predetermined trajectory, comprising the steps of:

providing a vessel having an interior including an inlet end and a discharge region having an orifice;

feeding a meltable metal material through the inlet end and into the vessel so that the metal material is contained within the interior of the vessel;

applying heat to the metal material contained within the interior to heat and melt the metal material so that it becomes a liquid metal at a high temperature;

positioning a thermally insulative impulse transmitting device in the interior of the vessel, the impulse transmitting device having a base end extending through the inlet end and outwardly from the interior of the vessel and a head end having a face positioned within the interior and adjacent the orifice; and providing a physical impulse to the base end of the impulse transmitting device so that the face of the impulse transmitting device is momentarily moved toward the orifice to create an ejection pressure at the orifice that ejects a discrete droplet of the liquid metal at a high-temperature from the orifice along a predetermined trajectory.

12. The method of claim 11 further comprising the steps of:

generating an electrical pulse in a pulse generator;

transferring the electrical pulse to an acoustic device positioned adjacent the base end of the impulse transmitting device;

converting in the acoustic device the electrical pulse into the physical impulse; and transferring the physical impulse from the acoustic device to the base end of the impulse transmitting device.

13. The method of claim 11 in which the droplet of liquid metal ejected from the orifice has a predetermined size, the method further comprising the step of feeding an inert gas through the inlet end and into the vessel to create an overpressure over the liquid metal at a high temperature so that as the overpressure is increased the predetermined size of the droplet of liquid metal ejected from the orifice is increased.

14. The method of claim 11 in which the meltable metal material is selected from a group consisting essentially of aluminum, zinc, and tin.

15. The method of claim 11 in which the meltable metal material is a meltable metal wire.

16. A high-temperature liquid droplet ejection apparatus for ejecting on demand a discrete droplet of liquid at a high temperature from an orifice along a predetermined trajectory comprising:

a vessel having an interior for containing a liquid at a high temperature, the interior including an inlet end, a discharge region having an orifice, and a sidewall connecting the inlet end and the discharge region;

a thermally insulative impulse transmitting device having a base end exterior of the vessel and extending through the inlet end of the vessel and a head end having a face positioned within the interior and adjacent the orifice; and an impulse generator including a pulse generator electrically connected to a loudspeaker positioned adjacent the base end of the impulse transmitting device, the pulse generator generating an electrical pulse and transferring the electrical pulse to the loudspeaker, the loudspeaker converting the electrical pulse into a physical impulse and transferring the physical impulse to the base end of the impulse transmitting device so that the face of the transmitting device is momentarily moved toward the orifice to produce an ejection pressure at the orifice that causes ejection of a discrete droplet of the high-temperature liquid contained in the vessel from the orifice along the predetermined trajectory.

17. The apparatus of claim 16 in which the loudspeaker includes a core surrounding the base end of the impulse transmitting device.

18. A high-temperature liquid droplet ejection apparatus for ejecting on demand a discrete droplet of liquid at a high temperature from an orifice along a predetermined trajectory comprising:

a vessel having an interior for containing a liquid at a high temperature, the interior including an inlet end, a discharge region having an orifice, and a sidewall connecting the inlet end and the discharge region;

a thermally insulative impulse transmitting device having a base end exterior of the vessel and extending through the inlet end of the vessel and a head end having a face positioned within the interior and adjacent the orifice; and an impulse generator including a pulse generator electrically connected to an pulse amplifier that is electrically connected to an acoustic device which is operatively associated with the base end of the impulse transmitting device, the pulse generator generating an electrical pulse that is amplified by a pulse amplifier and transferred to the acoustic device, the acoustic device converting the electrical pulse into the physical impulse and transferring the physical impulse to the base end of the impulse transmitting device so that the face of the transmitting device is momentarily moved toward the orifice to produce an ejection pressure at the orifice that causes ejection of a discrete droplet of the high-temperature liquid contained in the vessel from the orifice along the predetermined trajectory.

19. A method of ejecting on demand a discrete droplet of a liquid at a high temperature and a predetermined size from an orifice along a predetermined trajectory, comprising the steps of:

providing a vessel having an interior including an inlet end and a discharge region having an orifice;

feeding a meltable material through the inlet end and into the vessel so that the material is contained within the interior of the vessel;

applying heat to the material contained within the interior to heat and melt the material so that it becomes a liquid at a high temperature;

positioning a thermally insulative impulse transmitting device in the interior of the vessel, the impulse transmitting device having a base end extending through the inlet end and outwardly from the interior of the vessel and a head end having a face positioned within the interior and adjacent the orifice;

providing a physical impulse to the base end of the impulse transmitting device so that the face of the impulse transmitting device is momentarily moved toward the orifice to create an ejection pressure at the orifice that ejects a discrete droplet of the liquid at the high temperature and the predetermined size from the orifice along the predetermined trajectory; and feeding an inert gas through the inlet end and into the vessel to create an overpressure over the liquid at the high temperature so that as the overpressure is increased the predetermined size of the discrete droplet ejected from the orifice is increased.

\* \* \* \* \*